United States Patent Office 3,172,499
Patented Mar. 9, 1965

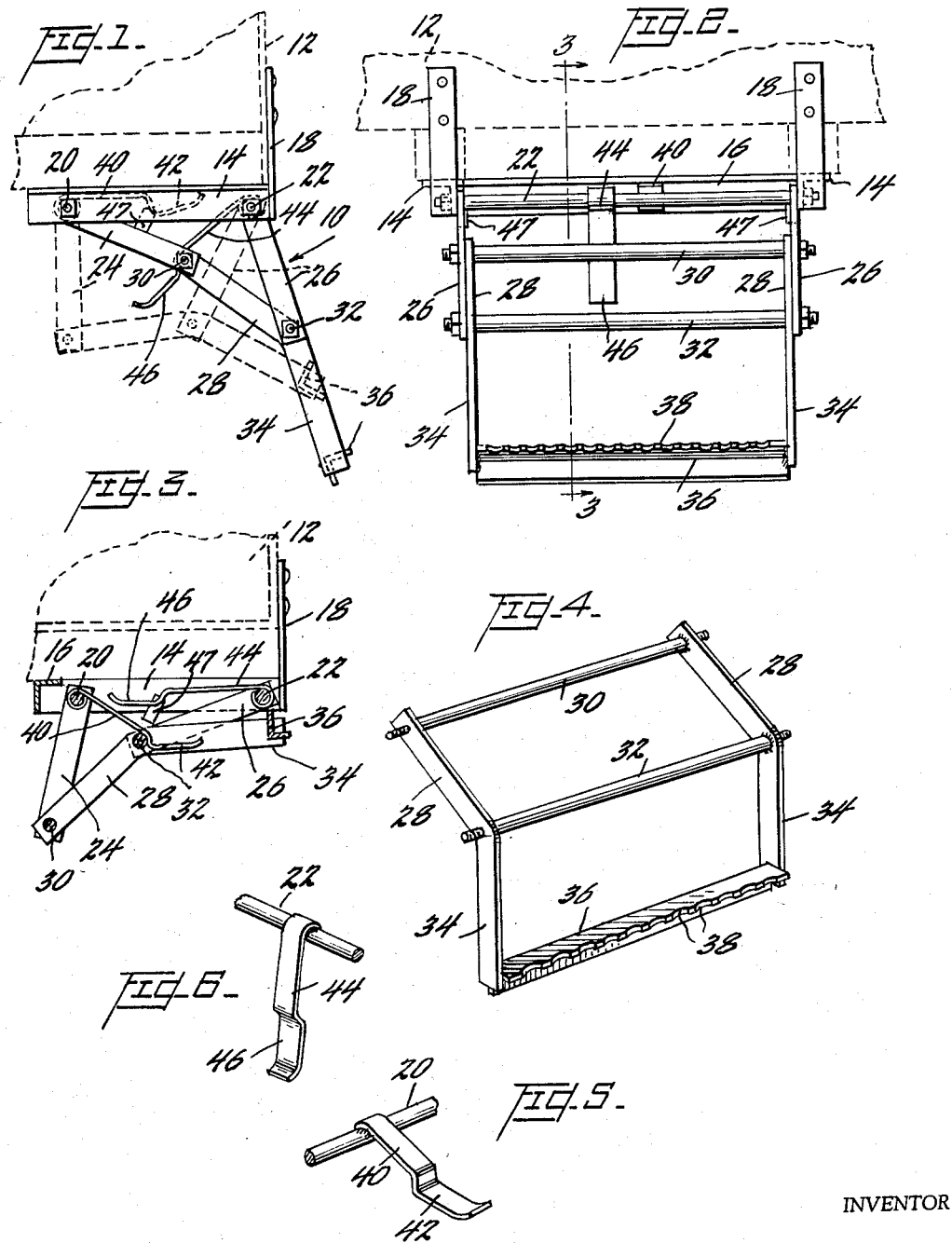

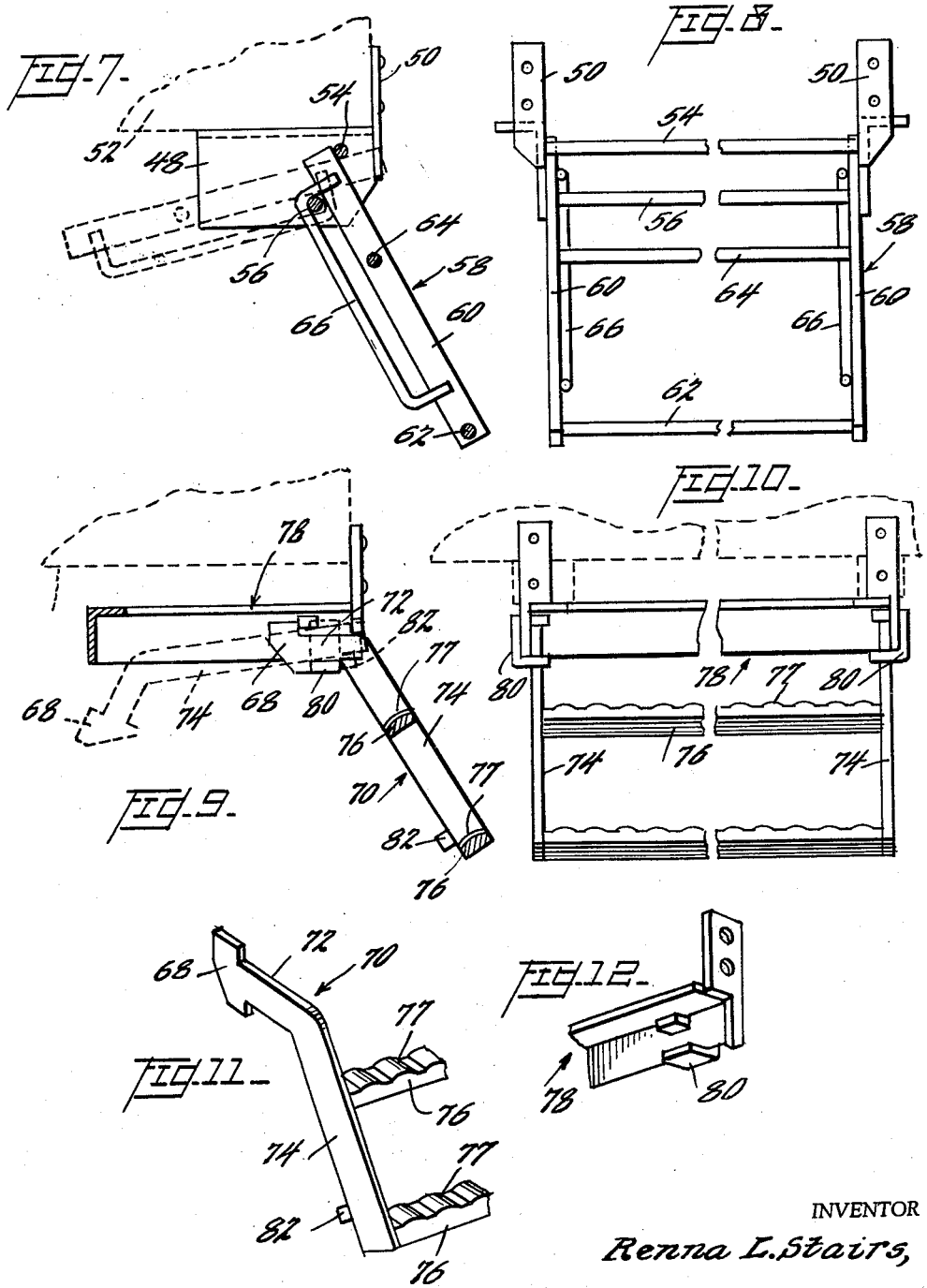

3,172,499
STOWABLE VEHICLE STEP
Renna L. Stairs, Bruning, Nebr.
Filed Nov. 19, 1962, Ser. No. 238,588
3 Claims. (Cl. 182—97)

This invention relates to auxiliary vehicle steps, and in particular to the type which facilitates access to the body of a truck or trailer, and which are movable to a stowed position when not in use. Many proposals have been advanced heretofore for appendages of this character, with varying degrees of success, none of which, however, have attained any wide degree of acceptance, due to various inherent shortcomings, as for instance, complexity of structure, excessive cost, difficulty of maintenance, and something less than a desired degree of fidelity of operation and smoothness of operation, and it is a general object of the present invention to overcome such shortcomings.

With particular reference to the objection as to complexity, it is an object to provide a simple structure wherein stowage, or collapse, is facilitated, without sacrifice to the main function of load bearing, in accommodating humans in use. More particularly, it is a related object to provide a collapsible step in which rungs are employed, in contradistinction to steps, and for purposes of this disclosure a "rung" is intended to mean a cross-piece in the ladder-like step, which is small in lateral dimension, regardless of shape, or, otherwise stated, comparable in size, and length-width ratio, to other, integrating structural members in the assembly.

Yet another, and also related object, is to provide a step of linkage form, having axles, and having rungs comparable in dimensions to said axles. A still further object is to provide an axle system comprising a system of spring stops swingable into and out of operating position with rotating movement of the axles.

Another object is to provide a disappearing step having a pair of side-by-side, rung-holding rails, each having angularly disposed sections meeting in a vertex, and adapted for cooperation with a system of suspension yokes or slings.

These and other objects, which will be apparent, are attained by the present invention, a preferred form of which is described in the following specification, as illustrated in the drawings, in which:

FIGURE 1 is a side elevational view, showing a fragment of a truck, mounting a step according to one form of the invention, with the working position of the step shown in solid lines, and an intermediate position shown in broken lines;

FIGURE 2 is a front elevational view of the step shown in FIGURE 1;

FIGURE 3 is a view similar to FIGURE 1, showing the step linkage in stowed position;

FIGURE 4 is a perspective view of a rigid component of the step linkage, showing the rungs, their mounting rails, and one axle member;

FIGURE 5 is a fragmentary view, in perspective, showing one of the spring detents, of the device in FIGURES 1-4;

FIGURE 6 is a fragmentary view, in perspective, showing the other spring detent of the device of FIGURES 1-4;

FIGURE 7 is a side elevational view, in partial section, of a modified form of step, showing the operating position in solid lines, and the stowed position in broken lines;

FIGURE 8 is a front elevational view of the step of FIGURE 7;

FIGURE 9 is a view similar to FIGURE 7, showing a modified form of step;

FIGURE 10 is a front elevational view of the step of FIGURE 9;

FIGURE 11 is a fragmentary view, in perspective, of a portion of the step of FIGURE 9; and FIGURE 12 is a fragmentary view, in perspective, of the mounting yoke or bracket for the step shown in FIGURES 9–11.

Referring to the drawings by characters of reference, there is shown, in FIGURES 1–6, a step assembly indicated generally by the numeral 10, secured to a truck body 12, through a bracket system comprising two side, angle irons 14, a rear angle iron 16, and a pair of vertical, front plates 18.

The swingable step is constructed as a three-dimensional, quadrilateral linkage, in which the side angle irons 14 form one side of the solid quadrilateral, mounting two parallel axles 20, 22, from the opposite ends of which depend the two pairs of swingable links 24, 26. The fourth side of the quadrilateral is formed by links 28, with connecting pins or axles 30, 32, by which they are articulated to the lower ends of the two swinging links 24 and the two swinging links 26. As seen in FIGURE 1, the pin 32 forms the top rung of the step, in the extended or set-up position thereof, and the links 28 are, in effect, bell crank levers, having obliquely arranged extensions 34, at the outer ends of which is secured a flat cross-piece 36, having a scalloped outer edge 38, as a non-slip feature, and which may also serve as a mud scraper. The exact form of the rungs is not critical, the essential thing being that they be possessed of a high slenderness ratio, consistent with load-supporting strength, in aid of the stowage features. In the characterization given above, in the recital of the objects of the invention, the rungs are comparable in size and proportions to the rails 34, and the several links, as well as the pivot pins, and the mounting structure.

Each of the upper axles 20 and 22, fixedly carries a leaf spring type of holding detent, which are employable alternatively, in holding the step linkage in stowed position, and position of use. Thus, pin or axle 20 carries, medially of its length, a tongue of spring steel 40, secured as by welding, for swinging movement upon rotation of the pin, and having a hooked, or spoon-form outer end portion 42, which moves into the position shown in FIGURE 3 during stowage of the step, and receives and passes the pin 32 in a resilient, wiping action which results in placing the pin behind the hook portion, where it is retained against ordinary shocks and vibrations, and is removable, in a reverse movement, only by deliberate action of an operator.

Similarly, pin 32 fixedly carries a spring tongue 44, with a hooked end portion 46, adapted to resiliently receive and retain the pin 30 in the set-up position of the step (FIGURE 1). It will be noted that in each of the two positions of adjustment of the step, one leaf spring is in retaining position, and the other is raised to a position within the confines of the angle iron brackets 14, 16. This occurs in response to the swinging movements, and the fact that the detents are fixed to the pins, and as seen in FIGURE 2, the two leaf springs are staggered in their positions, longitudinally on the pins, to provide mutual clearance during the swinging movement.

The leaf springs are intended only to obviate accidental dislodgement of the linkage, and not to carry heavy loads. In the open, or set-up position of the step, the linkage is so arranged as to be self-sustaining under relatively heavy loads, with the resistance to collapse increasing in proportion to the load. This is accomplished by an over-center movement of the linkage, wherein links 24, 28 first attain a condition of aligned pivot centers, and then pass slightly beyond this position, as shown in FIGURE 1. In this over-center position, the links 24 contact stops 47, carried by angle brackets 14, which then provide the reaction thrust to hold the step linkage in position of use. For collapse, or stowage of the step, a slight pressure must be applied initially transversely to pin 30, to break the toggle linkage.

The modification shown in FIGURE 7 is similar to that of FIGURE 1 in that it comprises a step element with rungs, and with all parts of comparable size and propositions, to facilitate stowage and the attendant manipulation. In this form, a pair of outwardly facing angle brackets 48, with front plates 50, secured to a truck body 52, carry a pair of horizontally and vertically spaced rods 54, 56, which constitute the sole reaction members for supporting the step 58 in each of its two adjusted positions. The step proper comprises two side rails 60, with a lower rung 62 and an upper rung 64. Conveniently, these will be cut from rod stock used in the reinforcement of concrete, which has the advantage of a surface providing a non-skid tread. Each side rail 60 has a wide, U-form rod 66 extending laterally in spaced relation, and defining a slot in which the lower rod 56 is received, and which is therefore slidable along the rod from working position (full lines, FIGURE 7) to stowed position (broken lines, FIGURE 7). The manner in which the side rails engage the rods 54, 56 in the two positions will be clear from FIGURE 7.

In the form shown in FIGURES 9–12, the U-form rod is omitted, and the reaction thrusts are realized in a headed end 68 of a step unit 70, with side rails having angularly disposed segments 72 and 74, the latter supporting flat rungs 76 having frusto-cylindrical tread elements 77 on their upper surfaces. The supporting framework 78 is substantially the same as that shown in the FIGURE 1 modification, and in addition, has, at its outer end, a pair of angle brackets 80, which limit outward movement of heads 68. As seen in FIGURE 9 the, step rails bear on brackets 80 at the vertex between segments 72, 74, when the step is in working position, the reaction being taken by the framework 78, as transmitted by head 68, and in the stowed position, inner movement of the step is limited by stops 82, secured to rail segments 74, which contact angle brackets 80.

While certain, preferred embodiments have been shown and described, various modifications will be apparent, in the light of this disclosure, and the invention should not, therefore, be deemed as limited, except insofar as shall appear from the spirit and scope of the appended claims.

I claim:

1. An adjustable step unit comprising a bracket adapted for attachment, as to a vehicle, a step having side rails and rungs, and means associated with said bracket and said step for guiding said step between a working and stowed position, said means including stop means at each said position, said guide means comprising a U-shaped rod, with tines attached to each rail and defining a pair of slots, and said stop means comprising a pair of horizontally disposed rods, one of said pair of rods engaged in said pair of slots, the other of said rods located above said one rod, exteriorly of said step, said side rails serving as levers above a fulcrum formed by said one rod against a resisting force formed by said other rod in either of said positions, the ends of said rails extending longitudinally beyond said tines so as to abut said other rod when said step is in either of said positions.

2. The device of claim 1 wherein the center of gravity of said steps is located exteriorly about a vertical plane drawn through said pair of horizontally disposed rods when said steps are in either of said positions.

3. The device of claim 1 wherein said other rod defines an axis of rotation for movement of said step to each of said positions.

References Cited by the Examiner
UNITED STATES PATENTS

| | | | |
|---|---|---|---|
| 168,298 | 9/75 | Travis | 297—430 |
| 2,279,329 | 4/42 | King | 182—88 |
| 2,533,050 | 12/50 | Runyen | 182—91 |
| 2,642,217 | 6/53 | Jennings | 182—88 |
| 2,772,097 | 11/56 | McDonald | 182—88 |
| 2,852,271 | 9/58 | McDonald | 182—88 |

HARRISON R. MOSELEY, *Primary Examiner.*

FRANK B. SHERRY, CHARLES E. O'CONNELL,
*Examiners.*